(12) United States Patent
Hwang et al.

(10) Patent No.: US 7,736,809 B2
(45) Date of Patent: **\*Jun. 15, 2010**

(54) RECHARGEABLE LITHIUM ION BATTERY

(75) Inventors: Duck-Chul Hwang, Suwon-si (KR);
Yun-Suk Choi, Suwon-si (KR); Zin Park, Suwon-si (KR); Jong-Ki Lee, Suwon-si (KR); Jea-Woan Lee, Suwon-si (KR); Chung-Kun Cho, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/014,049

(22) Filed: Jan. 14, 2008

(65) Prior Publication Data

US 2008/0131784 A1 Jun. 5, 2008

Related U.S. Application Data

(62) Division of application No. 10/949,669, filed on Sep. 24, 2004.

(30) Foreign Application Priority Data

Sep. 26, 2003 (KR) ................. 10-2003-0066894
Sep. 26, 2003 (KR) ................. 10-2003-0066895

(51) Int. Cl.
*H01M 4/72* (2006.01)
(52) U.S. Cl. .............. 429/234; 429/246; 429/245; 429/231.4; 429/231.8; 429/231.1; 429/231.3; 429/324; 429/337; 429/341; 429/199; 429/339; 429/342

(58) Field of Classification Search ................. 429/234, 429/246, 245, 231.4, 231.8, 231.1, 231.3, 429/324, 337, 341, 199, 339, 342
See application file for complete search history.

(56) References Cited

U.S. PATENT DOCUMENTS 5,521,028 A    5/1996    Gauthier et al.

(Continued)

FOREIGN PATENT DOCUMENTS

CN    1316787 A    10/2001

(Continued)

OTHER PUBLICATIONS

Patent Abstracts of Japan for Publication No. 09-283149; Date of publication of application Oct. 31, 1997, in the name of Hisashi Tsukamoto et al.

(Continued)

*Primary Examiner*—Laura S Weiner
(74) *Attorney, Agent, or Firm*—Christie, Parker & Hale, LLP

(57) ABSTRACT

Disclosed is a rechargeable lithium ion battery including a positive electrode comprising a first current collector and a positive active material layer on the first current collector; a negative electrode comprising a second current collector and a negative active material layer on the second current collector; and an electrolyte comprising a non-aqueous organic solvent and a lithium salt. At least one of the first and the second current collectors includes a rigid polymer film with a metal deposited on the rigid polymer film.

10 Claims, 1 Drawing Sheet

U.S. PATENT DOCUMENTS

| | | |
|---|---|---|
| 5,587,256 A | 12/1996 | Wilson et al. |
| 6,933,077 B2 | 8/2005 | Sudano et al. |
| 7,560,192 B2 * | 7/2009 | Hwang et al. ............... 429/245 |
| 2004/0072066 A1 | 4/2004 | Cho et al. |
| 2004/0241549 A1 | 12/2004 | Cho et al. |

FOREIGN PATENT DOCUMENTS

| | | |
|---|---|---|
| CN | 1415122 A | 4/2003 |
| JP | 9-120818 | 5/1997 |
| JP | 9-213338 | 8/1997 |
| JP | 9-283149 | 10/1997 |
| JP | 9-320568 | 12/1997 |
| JP | 10-040920 | 2/1998 |
| JP | 2001-6737 | 1/2001 |
| JP | 2003-45415 | 2/2003 |
| WO | WO 01/39302 A1 | 5/2001 |

OTHER PUBLICATIONS

Patent Abstracts of Japan for Publication No. 09-120818; Date of publication of application May 6, 1997, in the name of Naoyuki Sugano.

Patent Abstracts of Japan, Publication No. 09-213338, dated Aug. 15, 1997, in the name of Kenji Nakai et al.

Patent Abstracts of Japan, Publication No. 09-320568, dated Dec. 12, 1997, in the name of Masaya Adachi et al.

Patent Abstracts of Japan, Publication No. 2001-006737, dated Jan. 12, 2001, in the name of Tokutetsu Ko et al.

Patent Abstracts of Japan, Publication No. 2003-045415, dated Feb. 14, 2003, in the name of Mitsuhiro Mori et al.

Japanese Office action dated Nov. 24, 2009, for corresponding Japanese application 2004-273144, noting listed reference in this IDS, as well as other Japan references previously filed in an IDS dated Jan. 14 and May 30, 2008.

* cited by examiner

RECHARGEABLE LITHIUM ION BATTERY

CROSS REFERENCE TO RELATED APPLICATION

This application is a divisional application of U.S. patent application Ser. No. 10/949,669, now U.S. Pat. No. 7,560,192, filed Sep. 24, 2004 which is based on and claims priority to Korean Patent Application Nos. 2003-66894 and 2003-66895, both filed in the Korean Intellectual Property Office on Sep. 26, 2003, the entire disclosures of which are incorporated hereinto by reference.

FIELD OF THE INVENTION

The present invention relates to a rechargeable lithium ion battery, and more particularly, to a rechargeable lithium battery having good energy density and exhibiting good cycle life characteristics.

BACKGROUND OF THE INVENTION

Rechargeable lithium batteries, which are attractive as power sources for portable electronics, use organic electrolyte, and exhibit twice the discharge capacity of conventional batteries with alkaline aqueous solution electrolyte with higher energy density.

Positive active materials for the positive electrodes of rechargeable lithium batteries use lithium and transition metal-included oxides having a structure being capable of intercalating lithium. Examples include $LiCoO_2$, $LiMn_2O_4$, and $LiNi_{1-x}Co_xO_2$ ($0<x<1$). Negative active materials in a negative electrode use crystalline carbon, amorphous carbon, or a composite of carbon.

The positive electrode and the negative electrode are produced by mixing the active material, a binder and optionally a conductive agent to a composition in the form of slurry, and coating the composition on a current collector. The current collector generally uses aluminum for the positive electrode, and copper for the negative electrode.

Though a rechargeable lithium battery exhibits relatively high energy density and good cycle life characteristics, the rapid development in the corresponding electronics industries require still further improvements in the energy density and cycle life characteristics.

SUMMARY OF THE INVENTION

According to one embodiment of the present invention a rechargeable lithium ion battery is provided having good energy density and exhibiting good cycle life characteristics.

The lithium ion battery includes a positive electrode comprising a positive active layer provided on a first current collector; a negative electrode comprising a negative active layer provided on a second current collector; and an electrolyte comprising a non-aqueous organic solvent and a lithium salt. At least one of the first and the second current collectors includes a rigid polymer film with a metal layer deposited on the polymer film.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION

Figure 1:
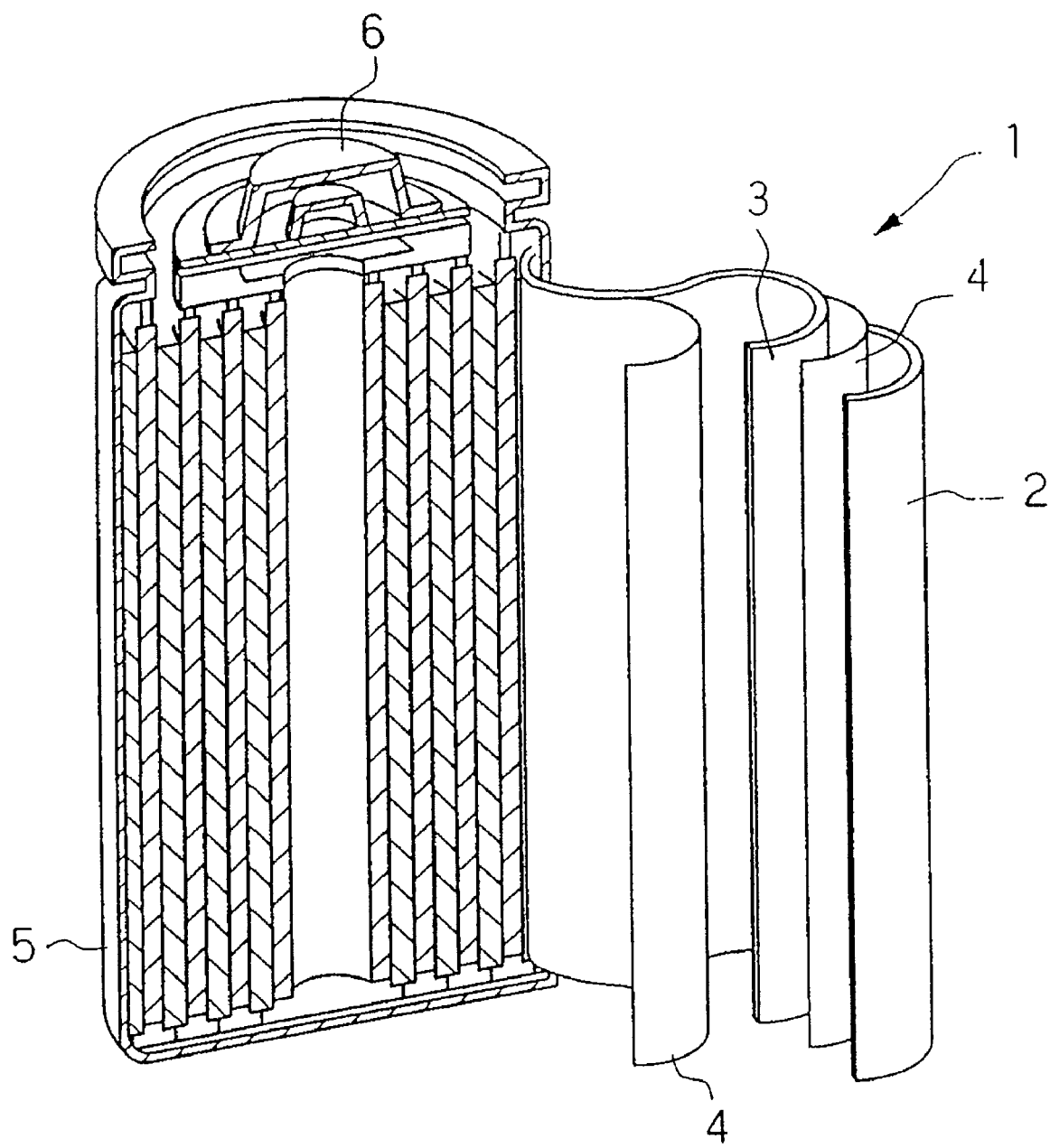
FIG. 1 is a drawing illustrating a rechargeable lithium ion battery.

The present invention is directed to improvements in the energy density and cycle life characteristics of rechargeable lithium ion batteries. For such improvements, the present invention uses a new current collector that is a lighter than conventional current collectors. Such a lighter current collector tends to reduce the weight of the battery, thereby increasing the energy density per weight. Furthermore, the current collector of the invention allows use of a lithium metal electrode.

The inventive current collector includes a polymer film with a metal deposited on the polymer film.

The polymer film has a rigid characteristic which keeps it from stretching during the rolling step of the battery fabrication process while still having sufficient flexibility to be rolled during the fabrication process. The polymer preferably has a melting point of 80° C. or more and examples of its construction include polyethylene terephthalate, polyimide, polytetrafluoroethylene, polyethylene naphthalene, polyvinylidene fluoride, polyethylene naphthalate, polypropylene, polyethylene, polyester, or polysulfone. The polymer has a molecular weight of 10,000 to 7,000,000, and preferably 50,000 to 5,000,000.

The polymer film has a thickness of 1 to 30 μm, preferably 2 to 25 μm, more preferably 1 to 30 μm, and most preferably 3 to 20 μm. If the thickness of the polymer film is less than 1 μm, it is difficult to handle. If the thickness of the polymer film is more than 30 μm, the energy density is reduced.

The polymer film may further comprise a silicon-based release layer. The release layer is formed on a side opposite the metal of the polymer film, and prevents direct contact between the polymer film and the active material when wound for transporting or storing of the electrode.

The silicon-based release layer may be formed using a compound of formula 1 by any one of generally-known coating technique such as roll coating, spray coating, or gravure coating.

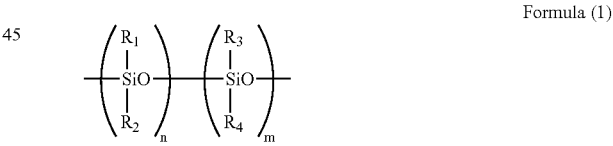

Formula (1)

where $R_1$, $R_2$, $R_3$ and $R_4$ are identically or independently selected from linear or branched alkyls, cyclic alkyls, alkenyl, aryls, aralkyls, halogenated alkyls, halogenated aryls, halogenated aralkyls, phenyls, mercaptanes, methacrylates, acrylates, epoxies, and vinyl ethers wherein the alkyls are preferably $C_1$ to $C_{18}$ alkyls, the cyclic alkyls are preferably $C_3$ to $C_{18}$ cyclic alkyls, the alkyneyls are preferably $C_2$ to $C_{18}$ alkyneyls, and the aryls and the aralkyls are preferably $C_6$ to $C_{18}$ aryls and aralkyls; and n and m are the same or different integers from 1 to 100,000.

The metal includes one or more of Ni, Ti, Cu, Ag, Au, Pt, Fe, Co, Cr, W, Mo, Al, Mg, K, Na, Ca, Sr, Ba, Si, Ge, Sb, Pb, In, and Zn.

The metal deposited on the polymer film preferably has a thickness of 10 Å to 10 μm, and more preferably 50 Å to 5 μm. If the metal is thinner than 10 Å, it generally cannot completely cover the surface of the polymer film, causing the formation of pinholes. On the contrary, if the metal is thicker than 10 μm, there is a relative decrease in energy density. In contrast, conventional current collectors tend to use layers of metal that are thicker, for example, about 15 μm for copper or about 20 μm for aluminum.

According to the present invention, because the metal can be provided as a thinner layer than can be used with conventional current collectors that tend to be very thick, it is lighter than the conventional current collector.

The current collector of the present invention may be used for one or both of the first and second current collectors used for the positive electrode and the negative electrode, regardless of the type of the electrode. Preferably, the first and the second current collectors both utilize the present invention, to better achieve the desired improvement in energy density per weight.

A positive active material for the positive electrode preferably comprises compounds being capable of reversibly intercalating and deintercalating lithium ions. Examples include compounds or mixtures of compounds represented by formulas 2 to 15:

$$LiAO_2 \quad (2)$$

$$LiMn_2O_4 \quad (3)$$

$$Li_aNi_bB_cM_dO_2 \text{ (where } 0.95 \leq a \leq 1.1, 0 \leq b \leq 0.9, 0 \leq c \leq 0.5 \text{ and } 0.001 \leq d \leq 0.1) \quad (4)$$

$$Li_aNi_bCo_cMn_dM_eO_2 \text{ (where } 0.95 \leq a \leq 1.1, 0 \leq b \leq 0.9, 0c \leq 0.5, 0 \leq d \leq 0.5, \text{ and } 0.001 \leq e \leq 0.1) \quad (5)$$

$$Li_aAM_bO_2 \text{ (where } 0.95 \leq a \leq 1.1 \text{ and } 0.001 \leq b \leq 0.1) \quad (6)$$

$$Li_aMn_2 M_bO_4 \text{ (where } 0.95 \leq a \leq 1.1 \text{ and } 0.001 \leq b \leq 0.1) \quad (7)$$

$$DS_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{(3-x)}F_2(PO_4)_3 \text{ (where } 0 \leq x \leq 3) \quad (14)$$

$$Li_{(3-x)}Fe_2(PO_4)_3 \text{ (where } 0 \leq x \leq 2) \quad (15)$$

where A is selected from Co, Ni, or Mn; B is Co or Mn; D is Ti or Mo; F is selected from Cr, V. Fe, Sc, and Y; F is selected from V, Cr, M, Co, Ni, and Cu; and M is at least one transition metal or at least one lanthanide selected from Al, Cr, Mn, Fe, Mg, La, Ce, Sr, and V.

The positive active material may include a coating layer on a surface of the bare compound, or a mixture of the compound and the coating compound. The coating layer may include at least one compound selected from the group consisting of hydroxides of a coating element, oxyhydroxides thereof, oxycarbonates thereof, and hydroxycarbonates thereof. The compound may be amorphous or crystalline. The coating element of the compound may be Mg, Al, Co, K, Na, Ca, Si, Ti, V, Sn, Ge, Ga, B, As, Zr, or mixtures thereof. The coating process may be performed by any technique that does not adversely effect the physical properties of the positive active material. Examples include spray coating, immersion coating, etc., and such methods are not described in detail since they are well understood by those in the related art.

A negative active material of the negative electrode includes a carbonaceous material that is capable of reversibly intercalating or deintercalating lithium ions, a lithium metal, an alloy of lithium metal, or a material being capable of forming a compound with lithium. Such materials include Al, Mg, K, Na, Ca, Sr, Ba, Si, Ge, Sb, Pb, In, and Zn.

The carbonaceous material may be a crystalline or amorphous carbonaceous material, and is preferably a crystalline carbonaceous material having an Lc (crystallite size) of at least 20 nm found through X-ray diffraction, and exhibiting an exothermic peak at 700° C. or more. The crystalline carbonaceous material is preferably a carbonaceous material prepared by carbonizing mesophase spherical particles and performing a graphitizing step on the carbonized material, or graphite fibers prepared by carbonizing and graphitizing.

The negative electrode may include a single protection layer or multiple protection layers on the surface of a negative active material. The protection layer may include an inorganic material, a polymer, or mixtures thereof.

Preferred inorganic materials include those selected from LiPON, $Li_2CO_3$, $Li_3N$, $Li_3PO_4$ and $Li_5PO_4$. A protection layer made from an inorganic material preferably has a thickness of 10 to 20,000 Å.

Preferred polymers include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, and combinations thereof. A protection layer made from such polymers preferably has a thickness of 100 Å to 10 μm. If the thickness of the protection layer is less than 100 Å, the protection layer is too thin and can be easily damaged. If the thickness of the protection layer is more than 10 μm, the ionic conductivity and the energy density decrease.

The electrolyte includes a non-aqueous organic solvent and a lithium salt.

The non-aqueous organic solvent acts as a medium that can transport ions that participate in the electrochemical reactions. Suitable non-aqueous organic solvents include benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a $C_2$-$C_{50}$ linear, branched, or cyclic hydrocarbon, and may include double bonds, aromatic cycling, or ether bonds), dimethoxyformamide, methylacetate, xylene, cyclohexane, tetrahydrofurane, 2-methyltetrahydrofurane, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, mevalolactone, and combinations thereof.

The lithium salts are dissolved in an organic solvent to act as a lithium-ion supporting source, helping battery operation and facilitating the transfer of lithium ions. Suitable lithium salts include $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiN(CF_3SO_2)_3$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI, and combinations thereof. The concentration of the lithium salt is preferably 0.1 to 2.0M in the electrolyte. If the concentration of the lithium salt is less than 0.1M, the conductivity of the electrolyte decreases, deteriorating the performance of the electrolyte. If the concentration of the lithium salt is more than 2.0M, the viscosity of the electrolyte increases, reducing the mobility of the lithium ions.

An embodiment of the rechargeable lithium battery of the present invention is shown in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic battery, pouch type battery, or other types of batteries as are well understood in the related art.

The following examples illustrate the present invention in further detail, but it is understood that the present invention is not limited by these examples.

Comparative Example 1

A $LiCoO_2$ positive active material, a polyvinylidene fluoride binder. and a Super-P conductive agent were mixed in an N-methyl pyrrolidone solvent at a weight ratio of 94:3:3 to prepare a positive active material slurry.

The slurry was coated on a 20 μm aluminum positive current collector and dried followed by pressing, thereby obtaining a positive electrode.

A carbon negative active material and a polyvinylidene fluoride binder were mixed in an N-methyl pyrrolidone solvent at a weight ratio of 94:6 to prepare a negative active material slurry. The slurry was coated on a 15 μm copper negative current collector and dried followed by pressing, thereby obtaining a negative electrode.

Using the positive electrode and the negative electrode, a lithium cell with a height of 45 mm, a width of 37 mm, and a thickness of 4.0 mm, and having a capacity of 650 mAh, was fabricated. As an electrolyte, 1.0M $LiPF_6$ in a mixed solvent of ethylene carbonate, dimethyl carbonate and ethyl methyl carbonate (3:3:4 volume ratio) was used.

Example 1

A lithium cell was fabricated by the same procedure as in Comparative Example 1, except that a 15 μm polyethylene terephthalate film on which both sides were deposited with aluminum at a thickness of 10,000 Å was used as the positive current collector, and a 15 μm polyethylene terephthalate film on which both sides were deposited with copper at a thickness of 10,000 Å was used as the negative current collector.

The weight of the cell according to Example 1 was lighter than that of Comparative Example 1 by 15.8%.

Example 2

A lithium cell was fabricated by the same procedure as in Comparative Example 1, except that a 15 μm polyethylene terephthalate film on which both sides were deposited with aluminum with a thickness of 5000 Å was used as the positive current collector, and a 15 μm polyethylene terephthalate film on which both sides were deposited with copper at a thickness of 5000 Å was used as the negative current collector.

The weight of the cell according to Example 2 was lighter than that of Comparative Example 1 by 16.5%.

Example 3

A lithium cell was fabricated by the same procedure as in Comparative Example 1, except that a 15 μm polyethylene terephthalate film on which both sides were deposited with aluminum at a thickness of 2000 Å was used as the positive current collector, and that a 15 μm polyethylene terephthalate film on which both sides were deposited with copper at a thickness of 2000 Å was used as the negative current collector.

The weight of the cell according to Example 3 was lighter than that of Comparative Example 1 by 17.0%.

Example 4

A lithium cell was fabricated by the same procedure as in Comparative Example 1, except that a 15 μm polyethylene terephthalate film on which both sides were deposited with aluminum at a thickness of 500 Å was used as the positive current collector, and that a 15 μm polyethylene terephthalate film on which both sides were deposited with copper at a thickness of 500 Å was used as the negative current collector.

The weight of the cell according to Example 4 was lighter than that of Comparative Example 1 by 17.2%.

Measurement of Battery Performance

The cells according to Examples 1 to 4 and Comparative Example 1 were charged at 0.2 C and discharged at 0.2 C, and the capacity and the energy density per weight of each was measured. The results are present in Table 1.

TABLE 1

| | Capacity (mAh) | Energy density per weight (Wh/kg) | Increasing percent of energy density per weight (%) |
|---|---|---|---|
| Comparative Example 1 | 650 | 152 | — |
| Example 1 | 650 | 181 | 18.8 |
| Example 2 | 650 | 182 | 19.8 |
| Example 3 | 650 | 82 | 20.4 |
| Example 4 | 650 | 184 | 20.7 |

As shown in Table 1, the cells according to Examples 1 to 4 exhibited identical capacity, but higher energy density per weight compared to that of Comparative Example 1 because the cells according to Examples 1 to 4 were lighter than the cell of Comparative Example 1. That is, the cells using the aluminum and copper respectively deposited on a polyethylene terephthalate film as the positive and the negative current collectors exhibited higher energy density per weight than the cell of Comparative Example 1 by from 18.8 to 20.7%.

In addition, the cycle life characteristics were measured on the cell with the lithium metal negative electrode without a current collector. That cell exhibited poor cycle life characteristics in that it had capacity retention of 5% for 50 cycles.

Example 5

A $LiCoO_2$ positive active material, a polyvinylidene fluoride binder and a Super-P conductive agent were mixed in an N-methyl pyrrolidone solvent at a weight ratio of 94:3:3 to prepare a positive active material slurry. The slurry was coated on a 20 μm aluminum positive current collector and dried followed by pressing, thereby obtaining a positive electrode.

As a negative electrode, copper was deposited on both sides of a 15 μm polyethylene terephthalate film at a thickness of 10 Å. Lithium was deposited on both sides of the copper-deposited polyethylene terephthalate film at a thickness of 15 μm.

Using the positive electrode and the negative electrode, a lithium cell with a height of 45 mm, a width of 37 mm, and a thickness of 4.0 mm, and having a capacity of 650 mAh was fabricated. As an electrolyte, 1.0M $LiPF_6$ in a mixed solvent of ethylene carbonate, dimethyl carbonate, and ethyl methyl carbonate (3:3:4 volume ratio) was used.

Example 6

A lithium cell was fabricated by the same procedure as in Example 5, except that copper was deposited on both sides of a polyethylene terephthalate film at a thickness of 30 Å.

Example 7

A lithium cell was fabricated by the same procedure as in Example 5, except that copper was deposited on both sides of a polyethylene terephthalate film at a thickness of 50 Å.

Example 8

A lithium cell was fabricated by the same procedure as in Example 5, except that copper was deposited on both sides of a polyethylene terephthalate film at a thickness of 75 Å.

Example 9

A lithium cell was fabricated by the same procedure as in Example 5, except that copper was deposited on both sides of a polyethylene terephthalate film at a thickness of 100 Å.

Example 10

A lithium cell was fabricated by the same procedure as in Example 5, except that copper was deposited on both sides of a polyethylene terephthalate film at a thickness of 200 Å.

Example 11

A lithium cell was fabricated by the same procedure as in Example 5, except that copper was deposited on both sides of a polyethylene terephthalate film at a thickness of 300 Å.

Example 12

A lithium cell was fabricated by the same procedure as in Example 5, except that copper was deposited on both sides of a polyethylene terephthalate film at a thickness of 500 Å.

Example 13

A lithium cell was fabricated by the same procedure as in Example 5, except that copper was deposited on both sides of a polyethylene terephthalate film at a thickness of 700 Å.

Example 14

A lithium cell was fabricated by the same procedure as in Example 5, except that copper was deposited on both sides of a polyethylene terephthalate film at a thickness of 1,000 Å.

Example 15

A lithium cell was fabricated by the same procedure as in Example 5, except that copper was deposited on both sides of a polyethylene terephthalate film at a thickness of 3,000 Å.

Example 16

A lithium cell was fabricated by the same procedure as in Example 5, except that copper was deposited on both sides of a polyethylene terephthalate film at a thickness of 5,000 Å.

Example 17

A lithium cell was fabricated by the same procedure as in Example 5, except that copper was deposited on both sides of a polyethylene terephthalate film at a thickness of 7,500 Å.

Example 18

A lithium cell was fabricated by the same procedure as in Example 5, except that copper was deposited on both sides of a polyethylene terephthalate film at a thickness of 10,000 Å.

Example 19

A lithium cell was fabricated by the same procedure as in Example 5, except that copper was deposited on both sides of a polyethylene terephthalate film at a thickness of 30,000 Å.

Example 20

A lithium cell was fabricated by the same procedure as in Example 5, except that copper was deposited on both sides of a polyethylene terephthalate film at a thickness of 50,000 Å.

Measurement of Battery Performance

The lithium cells according to Examples 5 to 20 were charged at 0.2 C and discharged at 0.5 C, and the capacity and the cycle life characteristic for the $50^{th}$ cycle (capacity retention) were measured. The results are presented in Table 2.

TABLE 2

|  | Thickness of the deposited copper (Å) | Capacity (mAh) | Capacity retention (%) |
| --- | --- | --- | --- |
| Example 5 | 10 | 650 | 10 |
| Example 6 | 30 | 650 | 15 |
| Example 7 | 50 | 650 | 78 |
| Example 8 | 75 | 650 | 85 |
| Example 9 | 100 | 650 | 88 |
| Example 10 | 200 | 650 | 90 |
| Example 11 | 300 | 650 | 95 |
| Example 12 | 500 | 650 | 96 |
| Example 13 | 700 | 650 | 97 |
| Example 14 | 1000 | 650 | 98 |
| Example 15 | 3000 | 650 | 98 |

TABLE 2-continued

|  | Thickness of the deposited copper (Å) | Capacity (mAh) | Capacity retention (%) |
|---|---|---|---|
| Example 16 | 5000 | 650 | 98 |
| Example 17 | 7500 | 650 | 98 |
| Example 18 | 10000 | 650 | 99 |
| Example 19 | 30000 | 650 | 99 |
| Example 20 | 50000 | 650 | 99 |

As shown in Table 2, the capacity did not depend on the thickness of the deposited copper, but the cycle life characteristics depended on the thickness of the deposited copper. In addition, it can be expected that when a lithium metal negative electrode is used in a lithium battery, especially at a thickness of 50 Å or more, excellent cycle life characteristics are achieved as shown in Examples 7 to 20.

Example 21

A lithium cell was fabricated by the same procedure as in Example 5, except that nickel was deposited on both sides of a polyethylene terephthalate film.

Example 22

A lithium cell was fabricated by the same procedure as in Example 6, except that nickel was deposited on both sides of a polyethylene terephthalate film.

Example 23

A lithium cell was fabricated by the same procedure as in Example 7, except that nickel was deposited on both sides of a polyethylene terephthalate film.

Example 24

A lithium cell was fabricated by the same procedure as in Example 8, except that nickel was deposited on both sides of a polyethylene terephthalate film.

Example 25

A lithium cell was fabricated by the same procedure as in Example 9, except that nickel was deposited on both sides of a polyethylene terephthalate film.

Example 26

A lithium cell was fabricated by the same procedure as in Example 10, except that nickel was deposited on both sides of a polyethylene terephthalate film.

Example 27

A lithium cell was fabricated by the same procedure as in Example 11, except that nickel was deposited on both sides of a polyethylene terephthalate film.

Example 28

A lithium cell was fabricated by the same procedure as in Example 12, except that nickel was deposited on both sides of a polyethylene terephthalate film.

Example 29

A lithium cell was fabricated by the same procedure as in Example 13, except that nickel was deposited on both sides of a polyethylene terephthalate film.

Example 30

A lithium cell was fabricated by the same procedure as in Example 14, except that nickel was deposited on both sides of a polyethylene terephthalate film.

Example 31

A lithium cell was fabricated by the same procedure as in Example 15, except that nickel was deposited on both sides of a polyethylene terephthalate film.

Example 32

A lithium cell was fabricated by the same procedure as in Example 16, except that nickel was deposited on both sides of a polyethylene terephthalate film.

Example 33

A lithium cell was fabricated by the same procedure as in Example 17, except that nickel was deposited on both sides of a polyethylene terephthalate film.

Example 34

A lithium cell was fabricated by the same procedure as in Example 18, except that nickel was deposited on both sides of a polyethylene terephthalate film.

Example 35

A lithium cell was fabricated by the same procedure as in Example 19, except that nickel was deposited on both sides of a polyethylene terephthalate film.

Example 36

A lithium cell was fabricated by the same procedure as in Example 20, except that nickel was deposited on both sides of a polyethylene terephthalate film.

Measurement of Battery Performance

The cells according to Examples 21 to 35 were charged at 0.2 C and discharged at 0.5 C, and the capacity and the cycle life characteristics for the $50^{th}$ cycle (capacity retention) were measured. The results are presented in Table 3.

TABLE 3

|  | Thickness of deposited nickel (Å) | Capacity (mAh) | Capacity retention (%) |
|---|---|---|---|
| Example 21 | 10 | 650 | 11 |
| Example 22 | 30 | 650 | 16 |
| Example 23 | 50 | 650 | 76 |
| Example 24 | 75 | 650 | 84 |
| Example 25 | 100 | 650 | 87 |
| Example 26 | 200 | 650 | 91 |
| Example 27 | 300 | 650 | 94 |
| Example 28 | 500 | 650 | 96 |
| Example 29 | 700 | 650 | 97 |
| Example 30 | 1000 | 650 | 98 |
| Example 31 | 3000 | 650 | 98 |

TABLE 3-continued

| | Thickness of deposited nickel (Å) | Capacity (mAh) | Capacity retention (%) |
|---|---|---|---|
| Example 32 | 5000 | 650 | 98 |
| Example 33 | 7500 | 650 | 98 |
| Example 34 | 10000 | 650 | 99 |
| Example 35 | 30000 | 650 | 99 |
| Example 36 | 50000 | 650 | 99 |

As shown in Table 3, the capacity was not dependant on the thickness of the deposited copper, but the cycle life characteristics depended on the thickness of the deposited copper. In addition, it can be expected when a lithium metal negative electrode is used in a lithium battery with a current collector of the present invention, especially at a thickness of 50 Å or more, excellent cycle life characteristics are achieved as shown in Examples 23 to 35.

The present invention uses a metal-deposited polymer film as a current collector, thereby providing a rechargeable lithium ion battery exhibiting good energy density per weight. In addition, the use of the metal-deposited polymer film as the current collector allows use of a lithium metal negative electrode. In particular, metal is deposited on the polymer film in an appropriate thickness so that the capacity retention (cycle life characteristic) is improved by 10% to 99%.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A rechargeable lithium ion battery comprising:
   a positive electrode comprising a first current collector and a positive active material layer on the first current collector;
   a negative electrode comprising a second current collector and a negative active material layer on the second current collector; and
   an electrolyte comprising a non-aqueous organic solvent and a lithium salt, wherein at least one of the first and the second current collectors comprises a rigid polymer film having a melting point of about 80° C. and a thickness from 1 to 30 μm, and a layer of metal, wherein the layer of metal has a thickness from 50 Å to 10,000 Å and comprises a metal selected from the group consisting of Ti, Pt, Co, W, K, Na, Ca, Sr, Ba, Si, Ge, Sb, Pb, In, and combinations thereof, and wherein the polymer of the rigid polymer film is selected from the group consisting of polyethylene terephthalate, polyimide, polytetrafluoroethylene, polyethylene naphthalene, polyvinylidene fluoride, polyethylene naphthalate, polypropylene, polyethylene, polyester, and polysulfone.

2. The rechargeable lithium ion battery of claim 1, wherein the rigid polymer film has a thickness from 2 to 25 μm.

3. The rechargeable lithium ion battery of claim 2, wherein the rigid polymer film has a thickness from 3 to 20 μm.

4. The rechargeable lithium ion battery of claim 1, wherein the positive active material comprises a material selected from the group consisting of the compounds represented by formulas 2 to 15:

$$LiAO_2 \quad (2)$$

$$LiMn_2O_4 \quad (3)$$

$$Li_aNi_bB_cM_dO_2 \text{ where } 0.95 \leq a \leq 1.1, 0 \leq b \leq 0.9, 0 \leq c \leq 0.5, \text{ and } 0.001 \leq d \leq 0.1 \quad (4)$$

$$Li_aNi_bCo_cMn_dM_eO_2 \text{ where } 0.95 \leq a \leq 1.1, 0 \leq b \leq 0.9, 0c \leq 0.5, 0 \leq d \leq 0.5, \text{ and } 0.001 \leq e \leq 0.1 \quad (5)$$

$$Li_aAM_bO_2 \text{ where } 0.95 \leq a \leq 1.1, \text{ and } 0.001 \leq b \leq 0.1 \quad (6)$$

$$Li_aMn_2 M_bO_4 \text{ where } 0.95 \leq a \leq 1.1, \text{ and } 0.001 \leq b \leq 0.1 \quad (7)$$

$$DS_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{(3-x)}F_2(PO_4)_3 \text{ where } 0 \leq x \leq 3 \quad (14)$$

$$Li_{(3-x)}Fe_2(PO_4)_3 \text{ where } 0 \leq x \leq 2 \quad (15)$$

and where A is selected from Co, Ni, and Mn; B is Co or Mn; D is Ti or Mo; E is selected from Cr, V, Fe, Sc, and Y; F is selected from V, Cr, M, Co, Ni, and Cu; and M is selected from Al, Cr, Mn, Fe, Mg, La, Ce, Sr, V and combinations thereof.

5. The rechargeable lithium battery of claim 1, wherein the negative active material is selected from the group consisting of a carbonaceous material that is capable of reversibly intercalating and deintercalating lithium ions, a lithium metal, an alloy of lithium, and a material that is capable of forming a compound with lithium.

6. The rechargeable lithium ion battery of claim 5, wherein the carbonaceous material has a crystal size in the c axis of Lc of at least 20 nm and an exothermic peak at 700° C. or more.

7. The rechargeable lithium ion battery of claim 5, wherein the carbonaceous material is a crystalline carbonaceous material prepared by carbonizing and graphitizing mesophase spherical particles, or a fibrous crystalline carbonaceous material prepared by carbonizing and graphitizing fibrous mesophase pitch.

8. The rechargeable lithium ion battery of claim 1, wherein the non-aqueous organic solvent is selected from the group consisting of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotolune, 1,2,4-triiodotoluene, R—CN where R is a $C_2$-$C_{50}$ linear, branched, or cyclic hydrocarbon, and may include double bonds, aromatic cycling, or ether bonds, dimethoxyformamide, methylacetate, xylene, cyclohexane, tetrahydrofuran, 2-methyltetrahydrofurane, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, mevalolactone, and combinations thereof.

9. The rechargeable lithium ion battery of claim 1, wherein the lithium salt is selected from the group consisting of $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiN(CF_3SO_2)_3$, $LiC_4F_9SO_3$, $LiAlO_4$, $LiAlCl_4$, $LiN(C_xF_{2x+1}SO_2)(C_xF_{2y+1}SO_2)$ where x and y are natural numbers of 0 or greater, LiCl, LiI and combinations thereof.

10. The rechargeable lithium ion battery of claim 1, wherein the lithium salt is provided at a concentration from 0.1 to 2.0M.

* * * * *

UNITED STATES PATENT AND TRADEMARK OFFICE
CERTIFICATE OF CORRECTION

| | | |
|---|---|---|
| PATENT NO. | : 7,736,809 B2 | |
| APPLICATION NO. | : 12/014049 | |
| DATED | : June 15, 2010 | |
| INVENTOR(S) | : Duck-Chul Hwang | |

It is certified that error appears in the above-identified patent and that said Letters Patent is hereby corrected as shown below:

Column 12, Claim 4, line 4      Delete "$0c \leqq 0.5$"
                                Insert -- $0 \leq c \leq 0.5$ --

Signed and Sealed this
Thirteenth Day of March, 2012

David J. Kappos
*Director of the United States Patent and Trademark Office*